United States Patent
Blume

(10) Patent No.: US 6,915,103 B2
(45) Date of Patent: Jul. 5, 2005

(54) SYSTEM FOR ENHANCING BOOKS WITH SPECIAL PAPER

(75) Inventor: Leo Blume, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 319 days.

(21) Appl. No.: 10/209,842

(22) Filed: Jul. 31, 2002

(65) Prior Publication Data

US 2004/0023200 A1 Feb. 5, 2004

(51) Int. Cl.[7] ............................................. G09B 5/00
(52) U.S. Cl. .................. 434/317; 434/169; 434/307 R; 345/173; 358/1.12
(58) Field of Search ................................ 434/118, 156, 434/169, 178, 307 R–309, 317, 350, 362; 345/156, 166, 173, 179; 235/375, 454, 462.01, 462.45, 462.49, 472.03, 487, 632; 358/1.12; 382/313; 396/313; 340/990; 400/630, 632

(56) References Cited

U.S. PATENT DOCUMENTS

| | | | | |
|---|---|---|---|---|
| 3,918,029 A | * | 11/1975 | Lemelson | 235/472.03 |
| 4,481,412 A | * | 11/1984 | Fields | 235/462.49 |
| 4,786,896 A | * | 11/1988 | Harte | 345/173 |
| 4,829,455 A | * | 5/1989 | Long et al. | 345/632 |
| 4,884,974 A |  | 12/1989 | DeSmet | |
| 4,922,236 A | * | 5/1990 | Heady | 345/166 |
| 4,993,558 A |  | 2/1991 | Assael | |
| 5,187,774 A | * | 2/1993 | Ericson | 358/1.12 |
| 5,466,158 A |  | 11/1995 | Smith, III | |
| 5,574,804 A | * | 11/1996 | Olschafskie et al. | 382/313 |
| 5,631,883 A |  | 5/1997 | Li | |
| 5,717,967 A | * | 2/1998 | Lee et al. | 396/313 |
| 5,739,814 A | * | 4/1998 | Ohara et al. | 345/173 |
| 5,795,213 A |  | 8/1998 | Goodwin | |
| 5,810,604 A |  | 9/1998 | Kopp, Jr. | |
| 5,945,656 A | * | 8/1999 | Lemelson et al. | 235/462.01 |
| 5,959,616 A | * | 9/1999 | Challener | 345/179 |
| 6,052,117 A |  | 4/2000 | Ohara et al. | |
| 6,201,947 B1 |  | 3/2001 | Hur et al. | |
| 6,218,964 B1 | * | 4/2001 | Ellis | 340/990 |
| 6,297,812 B1 |  | 10/2001 | Ohara et al. | |
| 6,330,976 B1 | * | 12/2001 | Dymetman et al. | 235/487 |
| 6,486,875 B1 | * | 11/2002 | O'Donnell, Jr. | 345/179 |
| 6,592,039 B1 | * | 7/2003 | Smith et al. | 235/462.49 |
| 6,655,597 B1 | * | 12/2003 | Swartz et al. | 235/462.45 |
| 6,668,156 B2 | * | 12/2003 | Lynch et al. | 434/317 |
| 6,678,499 B1 | * | 1/2004 | Silverbrook et al. | 434/350 |
| 6,708,208 B1 | * | 3/2004 | Philyaw | 709/223 |
| 6,750,978 B1 | * | 6/2004 | Marggraff et al. | 358/1.12 |
| 2002/0074403 A1 | * | 6/2002 | Krichever et al. | 235/454 |
| 2003/0082505 A1 | * | 5/2003 | Frohlich et al. | 434/180 |
| 2003/0116620 A1 | * | 6/2003 | Song | 235/375 |
| 2003/0152293 A1 | * | 8/2003 | Bresler et al. | 382/305 |
| 2004/0104890 A1 | * | 6/2004 | Caldwell et al. | 345/156 |

* cited by examiner

Primary Examiner—Joe H. Cheng

(57) ABSTRACT

A system for enhancement of books or other reading material includes an item of reading material, printed on a substrate having a substantially invisible, machine-readable coordinate grid. A pointing device is configured to detect the coordinate grid on the substrate when placed in proximity thereto. An output device receives input from the pointing device to determine the location of the pointing device relative to the substrate, and provides output corresponding to contents of the reading material at the location. The output may be in the form of audio and/or video.

24 Claims, 2 Drawing Sheets

SYSTEM FOR ENHANCING BOOKS WITH SPECIAL PAPER

BACKGROUND OF THE INVENTION

1. Field of the Invention

The present invention relates generally to enhancement for books or other written material. More particularly, the present invention relates to a system for providing audio and/or video corresponding to specific printed content on a page of specially prepared paper when the user points to the content on the page.

2. Related Art

Traditional books, magazines, newspapers, and other printed matter are silent and static—they cannot voice or display their own contents. Some methods have been developed to provide audio and/or video associated with printed matter. For example, there are books on audiotape, CD, and other media that provide the audible contents of the book. There are also computer systems and programs that provide the text of a book on a computer screen, and which may highlight words as they are read, provide audio and visual depictions of the book content, etc. In some of these systems, a user can click on a word or image to have it defined in writing, or have it spoken audibly. However, these types of systems are not books—they lack the visual dimension and tactile features of an actual book.

There are also books having a synchronized audio sound track or audio/visual representation on a tape, CD, DVD, etc., which allow a reader to follow along in the book (e.g. "turn the page when you hear the BEEP") while hearing the sounds or seeing visual depictions of the content. However, these systems generally require the reader to progress at the pace of the recording.

There are also systems that use a scanner to determine the location of a stylus on a page of paper that is printed with a special, frequently invisible, pattern. However, these sorts of systems have been developed for writing but not reading, and require specially prepared paper. These do not work with conventional published books or other printed matter.

However, many people would benefit from books if they could also provide their contents in audio and/or video form. For example, children who are pre-readers or who are learning to read could benefit from books and other printed material that provide audio and/or video output. Likewise, visually impaired readers, and readers of difficult content or foreign languages could also benefit from such a system.

SUMMARY OF THE INVENTION

It would therefore be advantageous to develop a system for providing audio and/or video enhancement for books or other printed matter.

It would also be desirable to have a system for providing enhancement for books or other printed matter that is self-paced, and in which the contents of the printed page cues the sounds.

The invention provides a system for enhancement of books or other reading material, comprising an item of reading material, a pointing device, and an output device. The reading material is printed on a substrate having a substantially invisible, machine-readable coordinate grid. The pointing device is configured to detect the coordinate grid on the substrate when placed in proximity thereto, and the output device is configured to receive input from the pointing device to determine the location of the pointing device relative to the substrate, and to provide audio and/or video output corresponding to contents of the reading material at that location.

In accordance with a more detailed aspect of the present invention, the system may include a connection to a computer network, such as the Internet, through which the output is obtained from a database of information corresponding to the content of the book.

In accordance with another more detailed aspect of the invention, the reading material may be a newspaper, and the system may be configured to make the newspaper interactive by providing updates to the reader via the output device.

Additional features and advantages of the invention will be apparent from the detailed description which follows, taken in conjunction with the accompanying drawings, which together illustrate, by way of example, features of the invention.

DETAILED DESCRIPTION

Figure 1:
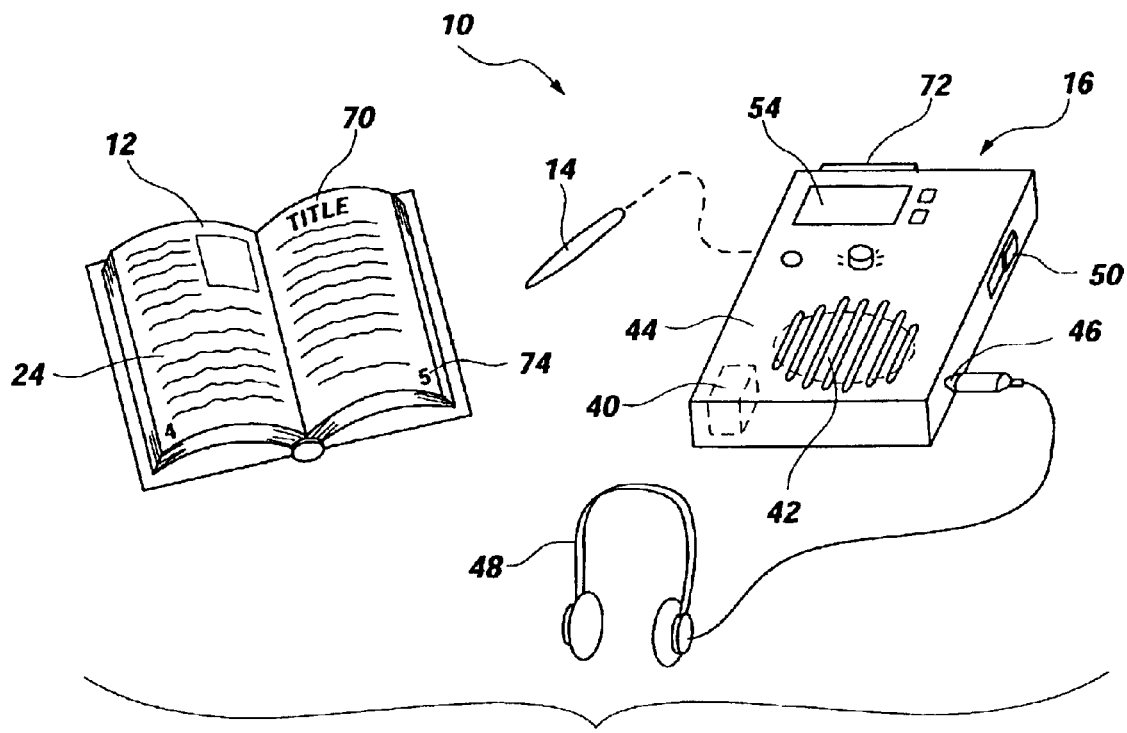
FIG. 1 is a perspective view of one embodiment of a system for enhancement of material that is printed on special paper.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention advantageously provides a system that provides audio and/or video output from printed matter—books, magazines, etc—that are printed on special paper. The output may be a spoken representation of words on the page, a spoken translation of words on the page, a spoken definition of words or symbols on the page, musical flourishes or sound effects corresponding to words, symbols or illustrations on the page, audio recordings of statements, quotes, events, or other news items, the performance of musical notes on the page, or any other audio and/or video output that enhances the use or effect of the printed matter. Video in this context can represent anything that might appear on a computer or television screen including additional text, animations, and imagery, both still and moving. The audio and/or video may be non-interactive or they may be presented in a way that is itself interactive. For purposes of this discussion, the term "book" will be used to refer to any type of printed media used with the system of this invention (including books, magazines, newspapers, looseleaf pages, etc.), and the term "image" will refer to anything printed on the page. Additionally, the terms "paper" and "page" are intended to refer to any type of substrate on which content is printed, whether it is actually paper or some other print media.

Figure 2:
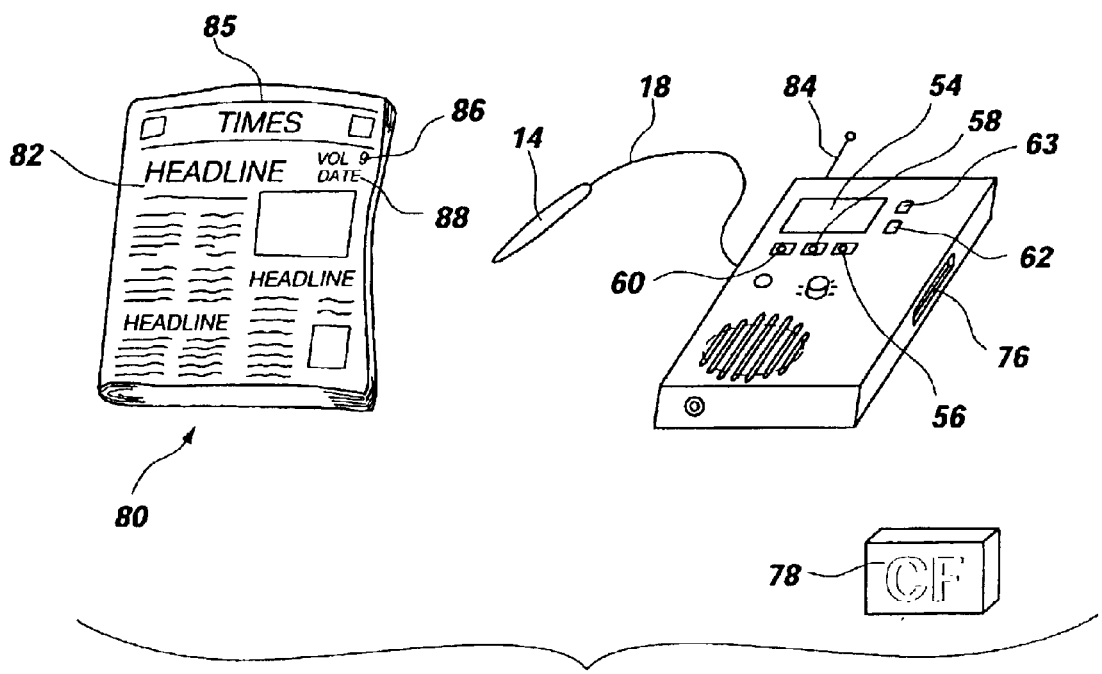
FIG. 2 is a perspective view of an alternative embodiment of a system according to the present invention wherein the printed material is a newspaper.

Shown in FIG. 1 is one embodiment of a system 10 for enhancement of a book 12 or other printed media made with special paper, in accordance with the present invention. As shown in FIG. 1, the system 10 generally includes a pointing device or stylus 14, and an output device 16. The stylus 14 is electronically interconnected to the output device 16. As shown in FIG. 1, this connection may be a wireless connection, such as via RF, infrared, or other well known short-range wireless transmission technologies. Alternatively, the stylus may be connected to the output device via a wire 18, as shown in FIG. 2.

Figure 4:
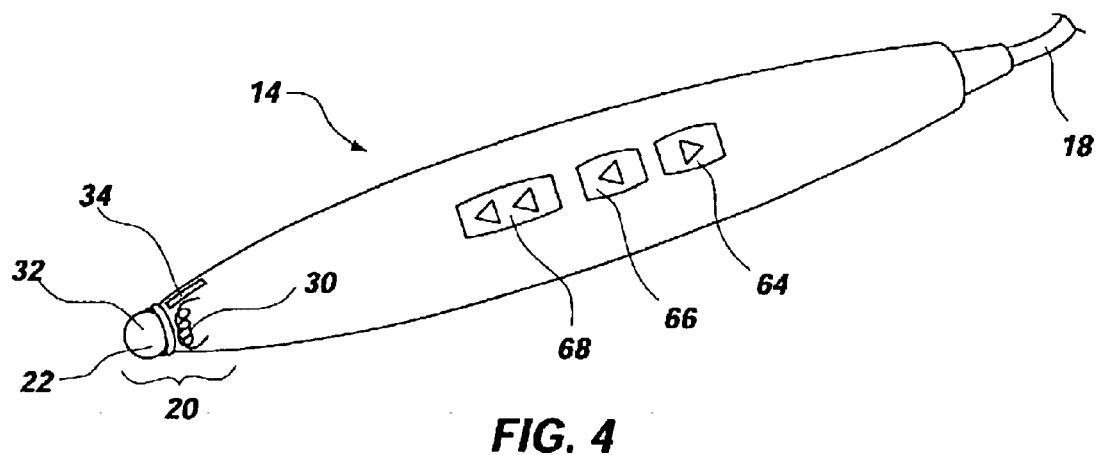
FIG. 4 is a close-up perspective view of a stylus configured for use with various embodiments of the system of the present invention.

Referring to FIG. 4, in one embodiment the stylus 14 is a pen-shaped device that is easy and convenient to handle. The distal end 20 of the stylus includes a detector 22, which detects the location of contact or close proximity of the distal end of the stylus on the page. The detector can be configured in various ways, depending on the nature of the special paper, as described in more detail below. Electrical power for the stylus may be obtained from internal sources (e.g. batteries) or from the output device 16, through either a wired or wireless connection, as noted above. The pointing device is used to interact with the top surface of a page 24 of the book, to allow coordinate locating of images on the page.

To use the system, a user first provides information to the output device 16 identifying the book 12 and the page number of the selected page 24. The user then taps or drags the distal end 20 of the stylus 14 along the page, over words, illustrations, or other printed images on the page. The stylus allows the system to detect the coordinates of the location that the user has contacted on the page. The output device uses this information, in combination with the identification of the page and the book, to index into a database of information, such as the audio track for the book. The output device then broadcasts the corresponding output retrieved from the database.

The entire process of detecting, retrieving, and broadcasting, takes only a fraction of a second, so as to seem essentially simultaneous to the user. As noted above, the output may be audible information such as a spoken word or syllable, a string of words, a sound, music, or it may be video information of various kinds. As an example, of the use of the system, when reading through a book sequentially in the typical manner, the user simply drags the stylus 14 over the words on the page 24 to prompt the output device 16 to audibly broadcast each word at whatever pace the user desires. When the user points to an illustration, the system may provide sound effects, music, explanation, or other output.

Figure 5:
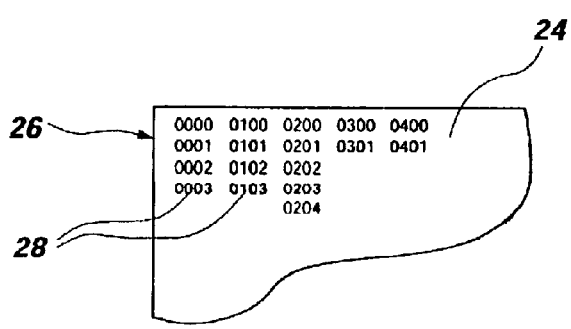
FIG. 5 is a partial close-up plan view of a portion of a page of special paper, showing normally invisible position detection grid.

The coordinate detection mechanism and configuration of the special paper may take many forms. Referring to FIG. 5, the page 24 comprises a special substrate material, such as specially prepared paper, which in one embodiment includes substantially invisible magnetic or ferrous particles that are patterned into a substantially invisible machine-readable coordinate grid 26. The coordinate grid may take many forms. In perhaps its simplest form, illustrated in FIG. 5, the grid comprises coordinate numbers 28, which directly indicate the X/Y coordinates of the location of the number. In one embodiment, the detector 22 of the stylus 14 comprises a coil 30. As the stylus is drawn over (or in close proximity to) the surface of the page, the movement of the coil relative to the magnetic or ferrous particles of the coordinate grid induces an electrical signal that is received by the output device 16. This signal is unique depending upon the X/Y position (i.e. horizontal and vertical coordinates) of the portion of the coordinate grid that is contacted. Because the content of the page is also unique in that way, detection of the X/Y position corresponds to detection of content.

The coordinate grid could operate on other principles as well. It could comprise conductive contact sensors, capacitive contact sensors, or magnetic sensors. It could also comprise tactile sensors, which sense some surface attribute of the coordinate grid material embedded in the page.

Referring again to FIG. 5, it will be apparent that the smaller and closer-together the numbers or other indicators in the grid 26, the greater will be the resolution of coordinate location detection. Moreover, it will be apparent that where an induction coil 30 is used, the stylus 14 need not actually touch the page 24 to function properly. Rather, the electrical signal produced by the coil only requires proximity to the ferro-magnetic particles in the grid, not actual contact.

In another embodiment, the coordinate grid 26 is patterned with a fluorescing compound, like invisible ink. In this embodiment, the detector 22 of the stylus 14 comprises an ultraviolet lamp 32 and an optical scanner 34, similar to bar code readers and other optical scanning devices that are well known. As the ultraviolet lamp is drawn over the page, the coordinate grid is exposed and "read" (i.e. detected) by the optical scanner. The signal created thereby is transmitted to and interpreted by the output device 16 to determine the coordinate location on the page, which designates the corresponding content of the page, and allows retrieval of that content from the database of information. This embodiment is representative of a broad class of techniques in which a light source that emits in a certain part of the spectrum is coupled with an ink that reacts with or is visible in light of that wavelength. This ink re-emits light that is then visible to a detector or sensor that is sensitive to light in a certain part of the spectrum. The light re-emitted from this special ink may or may not be at the same wavelength as the light from the provided lamp. However, the re-emitted light and the sensor should be compatible. Ordinarily the ink in which the coordinate grid is printed would either be invisible or barely visible to a human reader in natural light.

Figure 3:
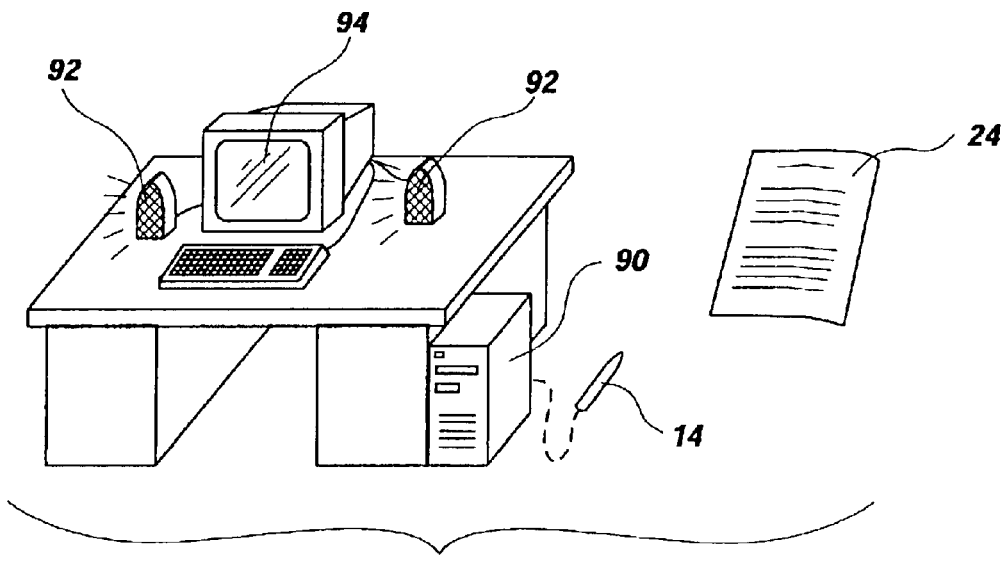
FIG. 3 is a perspective view of yet another alternative embodiment of a system according to the present invention wherein the broadcast device comprises a personal computer.

The output device 16 is the brains of the system. It can be configured in various ways, as shown in FIGS. 1–3. Referring to FIG. 1, the output device includes a microprocessor 40 and an audio speaker 42, contained in a housing 44. Alternatively or additionally, the output device may include a connector 46 for audio headphones 48. It will be apparent that the microprocessor 40 and audio speaker 42 need not necessarily be disposed in the same housing. The output device also includes general system controls, such as an on/off button or switch 50, a volume control knob 52, and an alphanumeric display 54, such as an LCD screen. Referring to FIG. 2, the output device may also include additional controls such as a page-advance button 56, a page-back button 58, a return-to-beginning button 60, a scroll button 62 and a select button 63 for allowing a user to scroll through a list on the LCD display and select a desired item. Other controls or input devices, such as an alphanumeric keypad (not shown), may also be included. Any or all of these system controls may comprise mechanical push buttons, or they may comprise discrete touch regions on the LCD display screen, which can be configured using touch screen technology. Some of these features may also take other forms, as described below. For example, referring to FIG. 4, the stylus 14 may include system controls, such as a page forward button 64, a page back button 66, and a go-to-beginning button 68. Other controls could also be included on the stylus.

The system may also include hardware or software that performs a debouncing function (similar to that performed on a standard computer keyboard). Debouncing prevents spurious, unintended gestures from being interpreted as a valid input request.

As noted above, it will be apparent that in order to retrieve and broadcast the appropriate output, the output device 16 must include or have access to the database of information related to the book. Furthermore, certain input is required in addition to the X/Y location information. The page number within the book must be known, and, if the system has access to more than one database of information, the user must somehow prompt the system to know which book has been selected (i.e. the identity of the book). There are many ways these functions can be accomplished. The user may use the push buttons and/or touch screen to input the identity of the book and the page number. Using the LCD display screen 54, the user can scroll through and sequentially highlight a desired item (i.e. a book title from the database) from a list using the scroll button 62. When the desired item is highlighted, the user then selects it by pressing the select button 63, or by tapping on the display screen with the stylus 14, or using some other action to identify the desired database. Alternately, devices of this type may have an audio capability that permits the book titles in the list to be spoken by the device as a way of augmenting or replacing the visual scrolling list. In still other implementations, book titles may be selected by having the user speak the name of a book where the user-spoken name is interpreted by speech recognition software and/or hardware on the device.

Referring back to FIG. 1, the system can be configured for direct book identification by scanning the stylus 14 over the book title or a unique number or code printed on or associated with the book 12, whether the code is visible or not. This number could be the International Standard Book Number (ISBN), the Universal Product Code (UPC), or the Library of Congress Card Catalog Number, for example. In this embodiment, the title page or some other page of the book (even all pages) includes a special invisible code at the location of the title 70 or book code (not shown), which, when scanned, identifies the book to the system. Alternatively, where the stylus includes an optical scanner, the system could include optical character recognition capabilities, and optically "read" the book title or identifying code, then use that information to access the relevant database. A similar system could be used for identifying the page of the book by reading a special invisible code at the location of the page number 74 on the page 24, or by reading the page number itself.

In addition to placing scannable book identification and page numbers at known and obvious locations, the book identification and page numbers could also be invisibly embedded in the information that contains the x/y coordinate position so that placing the stylus on any part of any page provides book ID, page number and x/y location. This permits extra identification information to be embedded everywhere.

The database of audio and/or video information related to the book may be stored in memory associated with the microprocessor 40. This storage may be permanent (i.e. the database is included in ROM), though such a configuration is somewhat inflexible. Alternatively, the output device 16 may include a connection port 72 which is configured to allow interconnection of the output device to one or more other devices (e.g. a computer or specialized digital device) from which the desired database may be selectively loaded into RAM associated with the microprocessor.

With reference to FIG. 2, as yet another more flexible alternative, the output device 16 may include a digital media slot 76 for removably receiving a digital memory device 78, such as a flash memory card, on which is stored the database of information related to one or more books. Where the database for just one book is stored on one removable media card, the user identifies the book to the system simply by selecting the media card corresponding to the book and inserting it into the media slot. Other alternatives for removable storage include media such as CD-ROMs and DVD-ROMs.

In the embodiment of FIG. 2, the printed material is in the form of a newspaper 80 that is printed on the special paper or other substrate discussed herein. Because newspapers are printed on two sides of each page (as are typical books), a separate coordinate grid 26 can be provided on each side of the page, or the grid can be configured such that the microprocessor 40 recognizes which side of the page is being scanned. When the user scans portions of a selected page 82 of the newspaper, the output device 16 operates as described above to provide audio and or video output to enhance the printed word. The output device may also be equipped with an antenna 84, allowing wireless connection, such as to the Internet, to allow the user to obtain audio updates related to stories appearing in the newspaper as the reader reads them. The user can also scan the title 85, volume number 86, date 88, or other identifying content in a manner similar to that described above for detecting the identity and page number of a book, in order to identify the paper and selected content to the output device. Also, as described above, information related to the title, volume number, date, etc. may be embedded within the grid of data on every page so that every spot on every page is completely self-identifying.

In another alternative embodiment, depicted in FIG. 3, the output device 16 may comprise a computer 90, which performs the functions of accessing the database of audio or visual information related to the book, and delivers audio and/or video output related thereto. For this embodiment, the database may be obtained in various ways, such as via floppy disk, CD-Rom, or a computer network, such as the Internet. Where the audio and/or video is delivered over the Internet, the user goes to the appropriate Internet site using the computer, and identifies the book 12 by either selecting from a list of titles on the Internet site, or by inputting or scanning a book identifier in the manner discussed above. Once the book is identified, the user provides the system with the page number, and the system operates as discussed above, except that the microprocessor that is associated with the computer 90 operates as the output device, and provides output over broadcast speaker(s) 92 or the computer monitor 94 associated with the computer.

The system embodiments described above can be designed so that certain actions with the stylus 14 provide specific input to the system. For example, the desire to turn or advance the page may be indicated to the microprocessor through a double tap with the stylus on the page 24, either in a designated location or anywhere. A triple tap on a given location might indicate a user request for a translation or definition of a word, or explanation of a figure or illustration.

These particular gestures are illustrative of the various gestures that can be associated with different functions of the device. Beyond counting the number of taps, the duration or intensity of a tap or the pattern of a sweeping gesture might have an assigned meaning in this context. Still others are possible.

Where optical character recognition (OCR) capability exists, additional features are also possible. Optical character recognition capability can allow random page access by scanning a page number, as noted above. However, it is important to remember that even with OCR, the system still uses the X/Y location detection to determine the desired output. This system is distinct from the use of OCR alone because it works on any content—text, symbols and pictures. This invention works with any content because it isn't really reading the content—it is simply reading the location on the page, and translating that to a reference to a database containing information for the book.

The OCR-enhanced system can also be configured to increase robustness of the system by comparing scanned text versus the database contents associated with the detected X/Y location on the page. This increases the accuracy of determination of the position of contact of the stylus by comparing the detected position of contact and the content associated therewith, with the content actually detected by the optical character recognition software. Accordingly, slight misalignment of the printed matter with the coordinate grid can be detected and automatically corrected. Likewise, where the detected content simply does not match the contents of the database, misidentification of the book can be detected.

This system enriches the reading experience by adding to books a new dimension for learning and entertainment. It is simple enough that a child can use it, and can be used with children's books, foreign language instructional texts, books that introduce new vocabulary (technical, medical, legal, etc), and provide speaking books for the visually impaired. Using a system of this sort, children can read books with minimal adult involvement, which can provide an aid in the early acquisition of reading skills. Additionally, people frequently have the need to read technical books and articles in languages other than their own. This system permits them to read these books with greater ease and understanding.

Many other applications are also possible. The system can be used for interactive applications, such as tests, automatically updated newspapers, and speed-reading training. For example, a multiple choice test may be printed on the special paper, such that a student simply selects their chosen answers by tapping on the selected answer. Audio feedback (such as through audio headphones) could be provided for purposes such as to give the definition of a word in a test question, or to confirm which answer the student has actually selected.

It is to be understood that the above-referenced arrangements are only illustrative of the application of the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A system for enhancement of printed reading material, comprising:
    a) an item of reading material, printed on a substrate having substantially invisible a machine-readable coordinate grid;
    b) a pointing device, configured to detect the coordinate grid on the substrate when placed in proximity thereto; and
    c) an output device, configured to receive input from the pointing device and to determine a location of proximity of the pointing device to the substrate, and to provide output corresponding to contents of the reading material associated with the location.

2. A system in accordance with claim 1, wherein the coordinate grid also includes information selected from the group consisting of the book title, page number, and date of publication.

3. A system in accordance with claim 1, wherein the reading material is selected from the group consisting of a book, a newspaper, a magazine, and a printed page.

4. A system in accordance with claim 1, wherein the pointing device comprises a stylus having a narrow spectrum lamp for providing narrow spectrum light, and an optical scanner configured to scan images, and the coordinate grid comprises a compound which is visibly detectable by the optical scanner when exposed to the narrow spectrum light.

5. A system in accordance with claim 4, wherein the narrow spectrum lamp is an ultraviolet lamp, and the coordinate grid comprises a fluorescing compound which is optically detectable when exposed to ultraviolet light.

6. A system in accordance with claim 4, further comprising optical character recognition software associated with the output device, whereby human-readable content on the substrate may be electronically detected.

7. A system in accordance with claim 6, wherein the output device is configured to compare the detected location of proximity and the content associated therewith, with the content actually detected by the optical character recognition software, so as to increase the accuracy of determination of the location of proximity.

8. A system in accordance with claim 1, wherein the pointing device further comprises operational controls for the output device.

9. A system in accordance with claim 1, wherein the substrate is paper.

10. A system in accordance with claim 1, wherein the pointing device comprises a stylus having an electrical coil, and the coordinate grid comprises ferro-magnetic material, configured such that the ferro-magnetic material induces a current in the coil when the coil is moved in proximity thereto.

11. A system in accordance with claim 1, wherein the output is selected from the group consisting of audio output and video output.

12. A system in accordance with claim 11, wherein the audio output is selected from the group consisting of a spoken representation of a word printed on the substrate, a spoken translation of a word printed on the substrate, a spoken definition of a word printed on the substrate, and a sound associated with an image printed on the substrate.

13. A system in accordance with claim 12, wherein the sound associated with the image on the substrate is selected from the group consisting of music and sound effects.

14. A system in accordance with claim 1, wherein the output device provides access to a database of content associated with the reading material.

15. A system in accordance with claim 14, wherein the database is stored upon removable media programmed with the contents of the reading material, and the output device includes an interface for receiving the removable media.

16. A system in accordance with claim 14, further comprising a connection to a computer network, the database being accessible via the computer network.

17. A system in accordance with claim 16, wherein the computer network is the Internet.

18. A system in accordance with claim 16, wherein the output device is configured to receive information that augments the contents of the reading material.

19. A system in accordance with claim 16, wherein the connection is a wireless connection.

20. A system in accordance with claim 1, wherein the machine-readable coordinate grid is substantially invisible to the human eye.

21. A system in accordance with claim 1, wherein the output device has access to a database containing the contents of the reading material.

22. A system for audio-enhanced reading, comprising:
a) an item of reading material, printed on a substrate having a substantially invisible, machine-readable coordinate grid;
b) a pointing device, configured to detect the coordinate grid on the substrate when placed in proximity thereto at a selected location; and
c) an output device, configured to receive input from the pointing device and to determine the selected location, and to provide audio output corresponding to contents of the reading material at the selected location.

23. An interactive reading system, comprising:
a) a page of reading material, printed on a substrate having a substantially invisible, machine-readable coordinate grid; and
b) an output device configured to provide output, from a database associated with the reading material, related to a selected image on the page, based upon (i) the identity of the reading material, (ii) the selected page, and (iii) a selected coordinate location on the page.

24. A method for reading, comprising the steps of:
a) using a pointing device to interact with a location of selected content on a page of reading material having a substantially invisible machine-readable coordinate;
c) detecting the location of said interaction on the page in relation to the coordinate grid; and
d) broadcasting, through an output device, output corresponding to the selected content from a database of information associated with the reading material.

* * * * *